Dec. 18, 1956  C. J. THATCHER ET AL  2,774,193
TOOLS FOR ULTRASONIC CUTTING
Filed Oct. 10, 1955  2 Sheets-Sheet 1
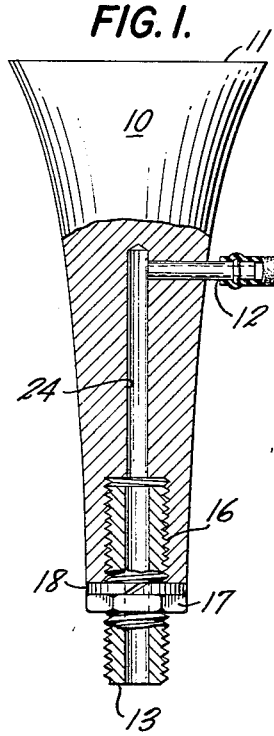
FIG. 1.
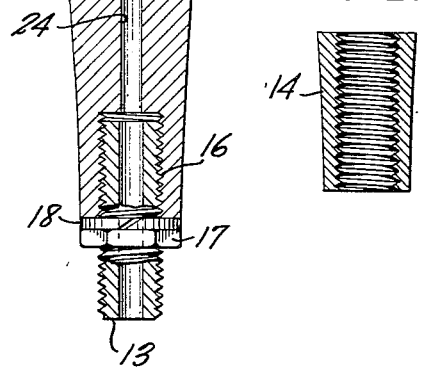
FIG. 2.
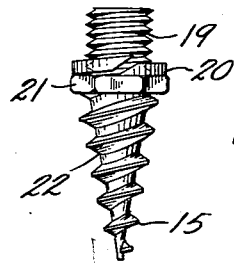
FIG. 3.
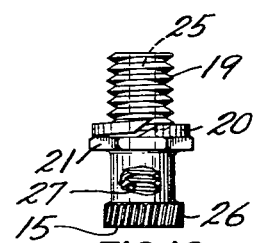
FIG. 10.
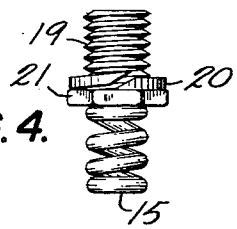
FIG. 4.
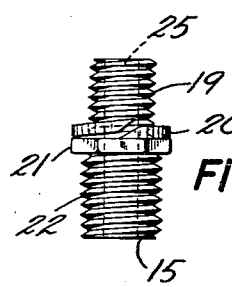
FIG. 5.
FIG. 7.
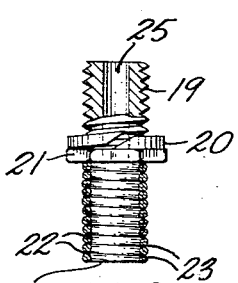
FIG. 6.
FIG. 9.
FIG. 8.
INVENTORS.
CHAS. J. THATCHER &
BENSON CARLIN
BY
*Moses, Nolte, Crews & Berry*
ATTORNEY

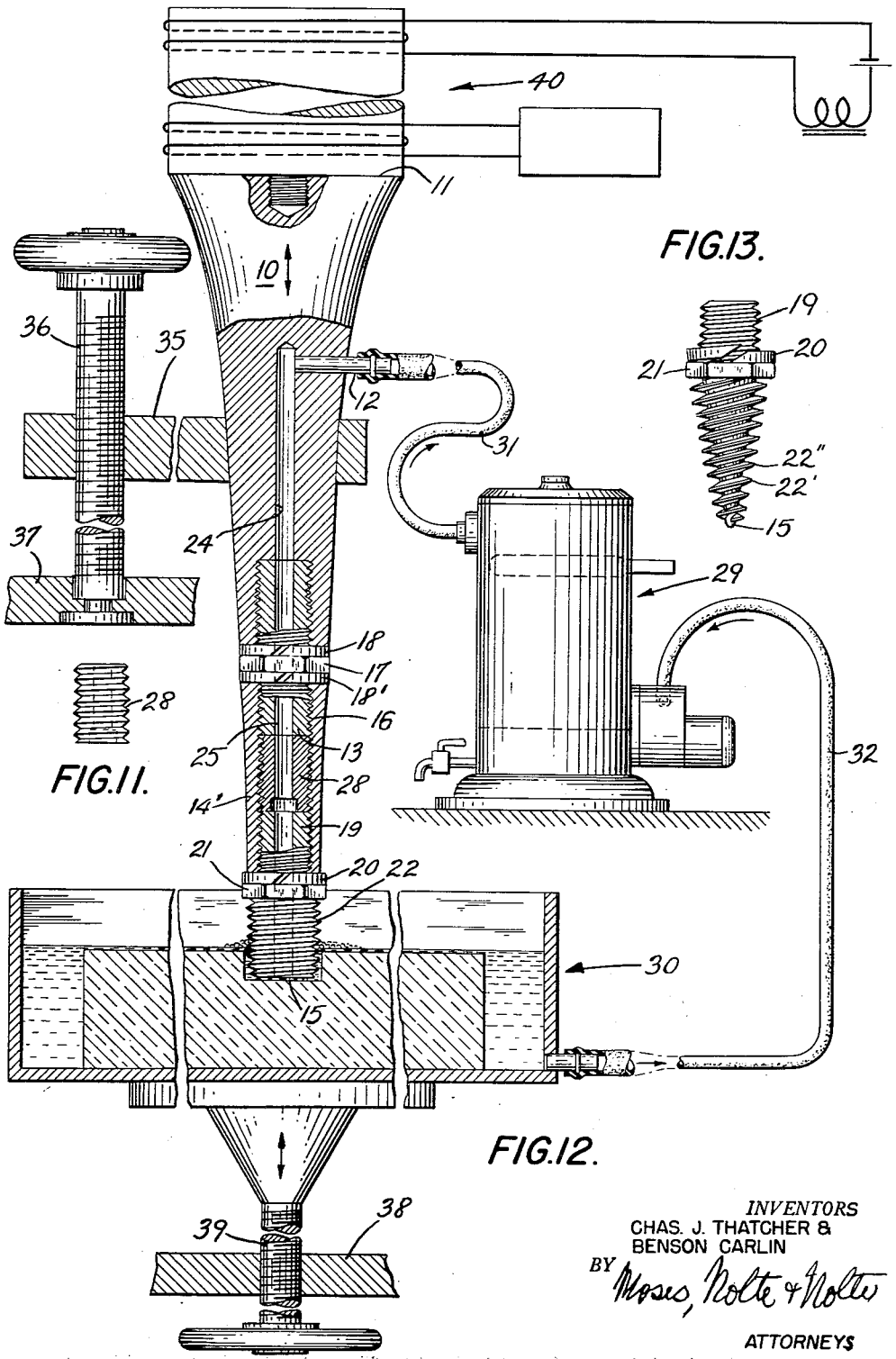

United States Patent Office 2,774,193
Patented Dec. 18, 1956

2,774,193
TOOLS FOR ULTRASONIC CUTTING

Charles J. Thatcher, New York, N. Y., and Benson Carlin, Fairlawn, N. J.; said Carlin assignor to said Thatcher Application October 10, 1955, Serial No. 539,405

15 Claims. (Cl. 51—59)

This invention relates to devices and a method for cutting or shaping hard, brittle materials by high frequency vibratory impact abrasion, such as the ultrasonic drilling or cutting of round, square, or of tapered or other irregularly shaped holes or passages (and especially the trepanning of cores therefrom) through glass, sintered carbides or similar hard, brittle materials.

The objects of our invention include the provision of means and a method whereby abrasive slurries, which are used in such cutting operations, will flow adequately and copiously during use over and around the peripheral sides as well as to the ends of the cutting tools, and so that all surfaces thereof are constantly bathed and floated in the liquid; and so as to insure that a stream of the liquid slurry flows over all such surfaces with sufficient velocity to insure a constant supply of freshly activated slurry of abrasive particles to all portions of the work surface of the tools and a constant sweeping away therefrom of the detritus of abraded work particles.

To this end it is an object of our invention to provide a suitable channel or channels in or about the surfaces of high frequency vibratory abrasive tools, so designed and arranged that said channels cannot become closed or clogged, either with solid cores of the work piece or with packed detritus therefrom during use of the tools, but will, rather, remain open for unimpaired flow of the liquid slurry to and from the tool end; and so that it can exert its maximum cutting action and also have an efficient detritus scavenging effect at all times.

A further object is to provide means securely to attach the cutting tool to the transducer or translator or intervening tool holder by means which will not involve heating of the materials of the tool or holder to such high temperatures or subject them to such abrupt temperature changes as to embrittle and/or harden the metals thereof—such as those of previously used methods of hard soldering which caused exposure to blow torch flames of the material of the tools during soldering, usually without subsequent annealing.

A further object of our invention is so to design the cutting tools and holders therefor that fracturing of the tool will not occur during use.

Still another object is to provide means whereby the tools may be quickly and readily secured and firmly attached to and readily detached from the tool holder, by mechanical, threaded means, rather than by the time-consuming means now employed, e. g., those involving soldering with hard solder.

It is, accordingly, a general objective of this invention to provide practical means and a method whereby to overcome the errors in technique of operation and design of ultrasonic cutting tools which, heretofore, have handicapped commercially extensive use of high frequency vibratory abrasion.

Embodiments of our invention capable of accomplishing its objectives and providing the advantages herein stated, and others which will appear, are described in the following specification, which may be better understood by reference to the following drawings, in which:

Fig. 1 illustrates, partly in front elevation, but mainly in a longitudinal sectional view, the tool holder or coupling means to attach the tool to a transducer;

Fig. 2 illustrates a longitudinal cross-sectional view of a thimble for attaching a tool to the threaded lower end stud of the tool holder;

Figs. 3, 4 and 5 illustrate various forms of the tool, per se, of this invention all shown in front elevation;

Fig. 6 is a longitudinal cross-sectional view of another form of the tool but showing only the central portion thereof in front elevation;

Figs. 7, 8 and 9 are transverse sectional views of various modifications of the tool end of the type of Fig. 6, showing square, triangular and ellipsoidal tool ends respectively;

Fig. 10 is a front elevation with one part broken away to show a partial vertical cross-sectional view of the bore of one form of tool adapted to drill holes and produce cores.

Fig. 11 illustrates a channeled, threaded washer, in front elevation, to be used in the adjustable assembly of elements of Fig. 12.

Fig. 12 illustrates, partly in front elevation and partly in a longitudinal sectional view, the coupled transducer, tool holder, nipple or thimble, and tool, also the pump and its connecting tubes for liquid slurry circulation, all combined together and engaged in drilling a hole in a glass workpiece.

Fig. 13 is a front elevation illustrating the form of drill tool of Fig. 3 with exterior channels for the circulation of liquid slurry to and from the tool end.

Referring now to Figs. 1 and 12, there is shown a tapered metallic member 10, the axis of which is to be aligned with the axis of vibration of the transducer 40, Fig. 12, to the lower or anti-node end of which the larger end 11 of 10 will be secured by any suitable means, such as a threaded stud. Member 10 is designed to serve as an energy transformer and to compress the area through which the wave oscillations imparted to it by the transducer are propagated as they travel down the tool holder or member 10, thus to increase the amplitude of vibration of the tool; and accordingly 10 is tapered in form as or similarly to that shown in outline in Figs. 1 and 12. The function and design of the tapered tool holder 10 is similar to those in use as is disclosed in the U. S. patent to Noyes, No. 2,044,807, issued June 23, 1936; similar use of tapered couplings of high frequency transducers to tools are shown also in the U. S. patents to Smith, No. 2,407,299, and Mason, No. 2,514,080, and applicants claim no novelty for this feature of their device.

Tapered tool holder 10 may be made of any material having suitable physical properties; but, in the illustrations of this application, it, and most, if not all, of the devices illustrated, are assumed to be constructed of brass, steel or Monel metal, the full wave lengths for which at 27,000 cycles are about 20 cm. Accordingly, we have shown the tool holder 10 in such dimensions that its overall length in the printed patent drawings will be about half-size; in use, and full size therefore, with an anti-node at upper, larger end 11, there will be nodes, and regions of no vibration, at the inlet tubulature 12 for slurry circulation, and also at the lower, small end 13 of member 10, these two points being, respectively, about 5 and 15 cm. from the input end 11 of the compressional wave vibrations.

Moreover, when either one of half size tools, Figs. 3 to 10, are attached to end 13 of tool holder 10 by the coupling thimble 14 of Fig. 2, the working tool end 15 of any tool will be about 20 cm., i. e., one wave length, from the input end 11 of the device and therefore at an anti-node and at a region of maximum vibration; it will be observed that each tool end, per se, has an over-all length of about 2.5 cm. in the patent drawings.

Although the combined length of the tool holder 10 and its tool end when attached is illustrated in the drawings as one-half size, i. e., one-half wave length long at resonant frequency, other multiples of one-half wave length for that dimension can be employed; and, since it is an object of this invention to avoid, if possible, the use of soldering—for reasons already explained—in assembly of the devices of this invention, it is desirable so to arrange dimensions that the juncture of tool holder end 13 with the tools of Figs. 3 to 10 hereof shall always be at a node and point of no vibration, so that threaded connections secured by lock washers (as shown) can be used there. Since frequencies and therefore wave-lengths of transducers vary under varying loads, adjustment of the over-all length of the combined tool and holder is desirable, which we attain by providing thimbles 14 or 14′ (Fig. 12) of various lengths; by using a thimble about 5 cm., longer than that illustrated in the half-size drawings, a quarter wave-length can be added to the total length of the tool, which may be very useful in commercial use. Of course metal to metal contact of ends 13 and 25 should always be maintained, as by the insertion, within sleeve 14 of any lengthened thimble, of a suitably proportioned and threaded washer 28, Figs. 11 and 12 provided with an internal channel so as to maintain an uninterrupted channel from 24, through the washer to channel 25.

The coupling and threaded connections referred to comprise, first, the stud bolt 16, which is provided with a hexagonal shoulder 17, preferably unitary with the bolts 16 and by which means it may be tightly clamped to the lower end of tapered member 10, being held in place by lock washer 18, all as shown in Fig. 1. The thimble 14 of the coupling of Fig. 2 is then screwed onto the lower end 13 of stud bolt 16, with or without an intervening lock washer; and into the lower end of 14 is screwed the threaded upper end 19 of any one of the tool ends of Figs. 3 to 10, the attachment being made secure by compression of a lock washer 20 provided with each tool end as shown. A hexagonal shoulder 21, preferably integral with the two ends of each tool, is provided to permit tight assembly of the parts all as illustrated in Fig. 12.

Referring now to the design of the working part of tool ends of Figs. 3 to 10, it will be observed that they may be tubular and circular in cross-section, as in Figs. 4 to 6 and 10, but also of any arbitrary complex shape, such as conical, square, triangular or ellipsoidal in outline, the latter shown in Figs. 3, 7, 8 and 9. Wound around the external surfaces—and preferably also about the internal surfaces of the tubular tool end—are channels 22 disposed in helical turns around the lower tool member and extending from near the hexagonal shoulder downwardly to the extreme lower end of the tool. In effect, each such helical channel is similar to the thread of a bolt or screw; but it may also take the form provided by a helically coiled spring, either tightly wound as in Figs. 6 to 9, or loosely coiled as in the tool end of Fig. 4. In either of these spring-like form of tool ends, channels 22 are provided exteriorly and also channels 23 interiorly (Fig. 6) of the shank of the tool, by the spaces between successive convolutions of the wire from which the tool end is formed. And the shank of the tool end may either be cylindrical throughout or be tapered in part or in whole from top to extreme lower end, as illustrated in Figs. 3 and 13, which show a channeled tool end having narrow lands between successive threads and a suitably shaped intervening exterior channels 22′ and 22″ (Fig. 13) to provide for continuous lifting and scavenging of detritus from the lower end of the cavity incised by the tool, the interior channel may be dispensed with in a conically ended tool, like that of Fig. 3 or Fig. 13.

Tools such as those of Figs. 6 to 9, which are formed by coils of thinner wire closely wound, may preferably be electroplated, in some instances, sufficiently to attach adjacent convolutions of the wire to one another, thereby to produce an integral and rigid tubular tool end, retaining, however, helically disposed channels both exteriorly and interiorly of the tool end; whether or not such treatment is better can be determined only by comparative trials under the conditions of use of untreated and plated wire-wound tubes.

Forced circulation of the abrasive slurry by means of a pump such as 29 of Fig. 12, forcing the liquid through channels 31 (of the pump outlet) and 12, 24 and 25 of the tool holder and escaping at end 15 of the tool ends, with return flow of the slurry to pump 29 through its intake tube 32 is desirable under most conditions of use, as, thereby, an ample scavenging of the detritus of abrasion and an ample supply of freshly activated slurry to the surface of the work being abraded will be assured. In the co-pending application of Charles J. Thatcher, Serial No. 371,408, now U. S. Patent 2,736,148, there is explained the reason why reactivation of the slurry, after use of any portion thereof, promotes efficiency of abrasive cutting and how such reactivation is accomplished.

It has been found by tests that tools provided with helically wound, surface channels penetrate with much greater rapidity into hard brittle materials such as glass or carboloy when channeled tools of this sort are used to develop vibratory abrasion or cutting. For when a tool having a smoothly shaped shank and bore penetrates into a work piece the fit between the surface of the tool shank and the adjacent work face of the drill hole is so close that no intervening spaces, and especially no intervening continuous channel, remain to permit either flow of the abrasive slurry downwardly to the advanced cutting faces of the tool or, on the other hand, to permit free upward, scavenging flow of abraded detritus sludge. Under these conditions—those heretofore used—the operative tool face soon ceases to be bathed in a stream, or even a quiescent film of abrasive slurry, and consequently ceases to function as intended.

Moreover, the minute chips from the abraded surfaces accumulate and pack in the lower part of the abraded passage, thus clogging the minute spaces such as those illustrated at 15 in Fig. 12 intervening between the tool face and the adjacent work. The result of these two unwanted conditions is a material retardation or, indeed a complete cessation of vibratory abrasive cutting; and this is generally accompanied by impact of the tool end upon the accumulated packed solid detritus in the hole, which soon causes the lower portions of the brittle work to break out or chip off, thus producing unsightly holes and commercially unuseful performance of the cutting device. Otherwise, further penetration into the work stops entirely.

These objectionable effects are obviated by our invention; for all surfaces of the tool, both peripheral and end surfaces, are constantly bathed in free-flowing abrasive slurry; it has been observed that the reciprocation of the channeled tool in the abraded passage functions somewhat like a valved plunger action in a force pump. Each downward stroke of the tool tends to force a small volume of the liquid slurry downwardly and into the minute space afforded by the clearance between the tool end and the adjoining work surface; each return, upward stroke of the high frequency cycles tends to lift and expel a corresponding small volume of abrasive liquid slurry, and of solid work detritus floating therein, toward the upper, open surface of the work. Since it has been observed that a very decided spray is thus projected constantly from the exposed channeled surfaces of those portions of a resonating tool which project above the upper work surface, a similar spurting of liquid spray from submerged, channeled lower tool surfaces may be expected.

Our invention contemplates, also, the provision of duplicate, parallel, helical grooves or channels 22' and 22" of Fig. 13 about a tool surface, to the end that one channel may serve for intake feed of slurry to the tool end and the other for the scavenging expulsion of liquid borne detritus. Vibratory abrasion cutting tools cannot be expected to function with maximum, or even fair efficiency unless such a cyclic or constrant flow of liquid slurry to and from the tool end or point and scavenging of detritus and drill hole is established. And, it will be noted, our invention accomplishes that flow without possibility of closure or clogging of the channel, because its direction is in all parts thereof substantially transverse of the direction of tool movement, so that no upstanding vertical core of uneroded work material can form and close any portion of the channel.

By cognizance of the foregoing considerations applicants have devised several various forms of tools which embody these requisite principles. Thus the form of tool illustrated by Figs. 3 to 9 comprises an elongated shank or spindle which may either be solid as in Figs. 3 and 13 or preferably hollow and tubular or cylindrical as in Figs. 5 to 9, or tapered almost to a point, as in Fig. 3 or 13. It is believed that the latter, tapered form of channeled tool will generally drill or cut more rapidly and produce cleaner, unchipped holes; and such holes or passages may when completed be either conical or tapered in configuration or strictly cylindrical, as determined by the extent of penetration of the pointed tool into or entirely through the work. For, the upper end of the shank of the tool end of Fig. 3, although it is not so illustrated in Fig. 3, may, of course, be strictly cylindrical, say from 22 to 21, the tapered lower end acting then as a roughing drill.

It will be observed that our use of ultrasonic cutting tools having helically fluted surfaces introduces a new species of ultrasonic abrasive cutting into the art, which heretofore has been limited to abrasion only of those surfaces which lie parallel to and not transverse of the plane of a tool end; whereas in our improved tool abrasion can and will be on surfaces both parallel to (at the tool ends) and transverse (at the tool sides) to the axis of tool vibration. Thus the action of any one of our tools may include both grinding and impact abrasion, whereas former drilling has comprised only grinding or impact abrasion.

The form of tool illustrated by Figs. 6 to 9 comprises moderately tightly coiled springs of wire, each tool having sufficient spaces on the surface between adjacent coils to provide an inside channel for flow of liquid slurry downwardly to the tool end and upwardly again outside the tool to and above the surface of the work. Such reversal of the direction of flow can and probably will be best attained by injecting the slurry through the pump outlet tube 31 initially into the central passage of the spring coil through inlet tubes 12 and 24 suitably provided in tool holders of Figs. 1 and 12 and by continued flow thence through the channel of 14 of the internally threaded nipple illustrated in Fig. 2. Of course the tool holder slurry nozzle 12 can be connected to the suction side through the intake tube 32 of the slurry circulating pump so as to aspirate the liquid slurry and thus reverse the direction of its flow to and from the tool end.

The stream of liquid slurry can thus be forced to flow either downwardly or upwardly through the channels 25 of each tool and, further, between the successive coils 23 of the spring, and the adjacent vertical peripheral wall of the core of the work, which wall will, of course, be relatively smooth and not channeled after cutting. After flow under the lowermost end 15 of the tool, the stream of liquid slurry then flows upwardly or downwardly through the external helical channel 22 between successive spring coils, and carries with it the abraded work detritus.

Fig. 10 illustrates another form of the tool of applicants' invention, which is designed to trepan cores or to drill or to cut passages of larger diameters through work pieces such as glass; in the illustration of Fig. 10 the diameter of the tool end, at 15 and 26, is no greater than the diameter of tool end of Fig. 5, and is but little greater than that of the ends 15 of tools of Figs. 4 or 6 to 9—all of which are illustrated as less than ½ inch in diameter. However, tool end 15 and 26 of Fig. 10 can be so fabricated that it is of larger diameters, exceeding ½ inch or even 1 inch. By providing tubular shells and internal channels 25 and 27 of correspondingly greater size, the wall of the shell and tool end 26 will be ⅛ or even only 1/16 inch thick, so that a core of the work piece ¾ or even 15/16 of an inch in diameter would be cut with a tool end 1 inch in diameter over-all.

It will be noted that the lower end of the tool of Fig. 10 is larger than the shank and that the peripheral wall of the enlarged end is knurled as at 26 and that the grooves of the knurling are inclined from the vertical axis of the tool; the purpose of this feature of the design is to prevent the formation of inwardly protruding ribs around the circular wall of the hole drilled through a work piece, which ribs, if they formed, would tend to close the channels and thus prevent flow and escape of the liquid slurry upwardly from beneath the tool end 15; such open channels are maintained by the grooves of the knurling at 26, if they are inclined at a sufficient angle from the axis of the vertical reciprocations of the tool end.

The liquid slurry is injected into the tool interior and flows out under the tool end 15, entering the tool through channels 12 and 24 of the tool holder of Fig. 1, and through channels 25 and 27 of Fig. 10, the latter channel (27) being threaded to permit unhindered flow of the slurry between the internal bore of the tool and the adjacent peripheral wall of the core cut from the work piece.

By our provision of such circuitous and/or inclined channels, both interiorly and exteriorly of the tool end, we have insured a copious and unhindered flow of liquid slurry through the unbroken channels between the tool sides and its end and the adjacent abraded surfaces of the work and thus attained efficient scavenging of the abraded powdered detritus.

Superficially considered it may be maintained by some workers in this art that the drilling of holes or shaping of cavities, generally, in hard materials by ultrasonic impact abrasion is analogous to the time-tried and well developed prior art of drilling or shaping of hard materials by low frequency impact, as of drilling stone or concrete by percussion blows with hammers on drill heads, actuated either pneumatically or by steam or even manually. But to hold that view overlooks the facts that low frequency impact drills usually, if not invariably, have no non-deviating axis of motion and consequently do not incise holes or cavities which are exact replicas of the tool end as does ultrasonic impact abrasive cutting. Low frequency, manually held, percussion drills have enough circular movement, accidental or intentional, to insure impact of the working tool end upon slightly different areas of the confronting work face with each blow; consequently, the fluting or convolutions on the periphery of the shank and ends of such tools do not, as do ultrasonic impact tools, leave solid replicas of their configuration remaining solidly attached to the main work material, so as to produce a drill hole, or to trepan a core which is an exact replica of the tool end. Another consequence of this fact is that incisions made by low frequency impact cutting, whether the removal of the work material be by chipping off in large chunks or by pure abrasion in finely comminuted detritus, invariably produces a drill hole larger in cross-wise circumferences than the tool itself. The result is that enough clearance always exists to provide ample space between the drill hole and the tool end and its shank to provide uninterrupted channels for movement or flow of solid detritus powder (or of liquid slurries carrying such powder) upwardly away from the bottom of the drill hole, so that it is more or less effectually scavenged and kept free of accumulated detritus—which otherwise impedes, stops or slows down the drill operation.

It should be obvious that no such uninterrupted channels for ejection of detritus occur when a hole is drilled with either smooth or fluted drill tools by ultrasonic abrasion. For, in the first place, under most circumstances the clearance between the walls of an ultrasonic impact drill hole and the periphery of the tool itself is usually less than .001 inch and may be less than that. The grit and detritus particles are often too large to pass through such minute openings and consequently lodge in and clog them at their narrowest point, which provides a "bottle neck," so to speak.

We claim:

1. A hollow tool for cutting or drilling of hard materials by vibratory ultrasonic, impact abrasion, having a blunt tool end and channels on the exterior and interior surfaces of said tool from the upper to the lower ends thereof for flow of liquid abrasive slurries to, under and from the working, lower end face of the tool, means to vibrate said tool, axially, at high frequency and low amplitude and to force said liquid through said channels, said channels having inlet and outlet ports to said working face which are inclined with respect to the axis of vibratory movement of said tool.

2. A hollow tool for cutting or drilling of hard materials by vibratory ultrasonic, impact abrasion, having a blunt tool end and channels on the exterior and interior surfaces of said tool from the upper to the lower ends thereof for flow of liquid abrasive slurries to, under and from the working, lower end face of the tool, means to vibrate said tool, axially, at high frequency and low amplitude and to force said liquid through said channels, said channels having inlet and outlet ports to said working face which are inclined with respect to the plane of the tool face.

3. A hollow tool for cutting or drilling of hard materials by vibratory ultrasonic, impact abrasion, having a blunt tool end and channels on the exterior and interior surfaces of said tool for flow of liquid abrasive slurries to, under and from the working, lower end face of the tool, means to vibrate said tool, axially, at high frequency and low amplitude and to force said liquid through said channels, said channels being incised on said surfaces and having inlet and outlet ports to said working face which are inclined with respect to the axis of vibratory movement of said tool.

4. A hollow tool for cutting or drilling of hard materials by vibratory ultrasonic, impact abrasion, having a blunt tool end and channels on the exterior and interior surfaces of said tool from the upper to the lower ends thereof for flow of liquid abrasive slurries to, under and from the working, lower end face of the tool, means to vibrate said tool, axially, at high frequency and low amplitude and to force said liquid through said channels, said channels being helically incised on said surfaces and having inlet and outlet ports to said working face which are inclined with respect to the plane of the tool face.

5. A tool for cutting or drilling of hard materials by vibratory ultrasonic, impact abrasion, having a blunt tool end and channels on the surfaces of said tool for flow of liquid abrasive slurries to, and under the working lower end face of the tool, means to vibrate said tool, axially, at high frequency and low amplitude and to force said liquid through said channels, said channels having inlet and outlet ports to said working face which are inclined with respect to the axis of vibratory movement of said tool.

6. A hollow tool for cutting or drilling of hard materials by vibratory ultrasonic, impact abrasion, having a blunt tool end and channels on the surfaces of said tool for flow of liquid abrasive slurries to, under and from the working, lower end face of the tool, means to vibrate said tool, axially, at high frequency and low amplitude and to force said liquid through said channels, said channels having inlet and outlet ports to said working face which are inclined with respect to the plane of the tool face.

7. A hollow tool for cutting or drilling of hard materials by vibratory ultrasonic, impact abrasion, having a blunt tool end and channels on the surfaces of said tool for flow of liquid abrasive slurries to, under and from the working, lower end face of the tool, means to vibrate said tool, axially, at high frequency and low amplitude and to force said liquid through said channels, said channels being helically incised on said surfaces and having inlet and outlet ports to said working face which are inclined with respect to the axis of vibratory movement of said tool.

8. A tool for cutting or drilling of hard materials by vibratory ultrasonic, impact abrasion, having a conical tool end and a channel on the surface of said tool from the upper to the lower ends thereof for flow of liquid abrasive slurries to, under and from the working, lower end face of the tool, means to vibrate said tool, axially, at high frequency and low amplitude and to force said liquid through said channels.

9. A method to provide a continuous flow of an abrasive slurry into and from a drill hole and to and between the working end of an ultrasonic impact tool and the confronting face of a work piece, and to scavenge detritus from the said drill hole, which comprises vibrating said tool, axially, at high frequency and low amplitude, forcing a stream of said slurry through channels about the exterior and interior surfaces of the tool from the upper end thereof to the lower, working surface, and the washing away of said detritus by the said stream of the slurry from the said end surface through said channels.

10. A high frequency, vibratory impact cutting system, for drilling holes in a substantially unyielding work material, comprising in combination a source of high frequency sound vibrations, an elongated, tapered vibration transmission medium coupled at its larger end to said source, a hollow, blunt ended cutting tool attached to the smaller end of said transmission medium, means to move and to vibrate said source, tapered medium and cutting tool end axially and maintain said end in proximity to the face of the material as it is cut, and means to inject into and to force from the interior of said hollow tool a liquid suspension of a comminuted abrasive and to impel it under the tool end, thus to scavenge abraded detritus from the locus between said abraded material and the cutting tool end.

11. The method of drilling a hole in a substantially non-yielding work material which comprises: positioning and maintaining the end of a hollow, blunt ended tool in proximity and axially normal to the confronting surface of said material, interposing between the tool end and said surface, a liquid suspension of a comminuted abrasive, developing axial vibrations at the locus of abrasion of high frequency and low amplitude, and impelling into and forcing through the interior of said tool and of said locus, a continuous stream of said liquid suspension, thus to scavenge the abrasion detritus from said locus and tool.

12. A combined ultrasonic tool holder and drilling or cutting tool which are adjustable as to their combined length and, thereby, adapted to resonate at varying frequencies under varying loads, which comprises, in combination with an energized ultrasonic oscillator, a tapered metal tool holder of a length which is substantially three-quarters or a multiple thereof of the wave length of sound waves in said metal at the operative frequency of the device at resonance, said tool holder being threadedly connected, at its larger end, to the operative end of said oscillator, a threaded stud having an integral hexagonal shoulder between its ends, which stud is attached to and projects from the smaller end of said tool holder, said tool holder and stud having a length, when combined, which is three-quarters or a multiple thereof of the wavelength of sound waves at resonance and loaded operative frequency, a blunt ended cutting tool integral with a threaded stud and a hexagonal shoulder located between the adjoining ends of said tool and stud, which together have a combined length which is substantially one-quarter wave length of the said sound wave or multiple thereof, a hollow, internally threaded thimble having a length which is slightly less than the combined lengths of said stud members and adapted to receive and join said studs, end to end, in metallic contact, and a lock washer embracing one of said studs and adapted to produce a secure and tight fit between the ends of said thimble and adjacent surfaces of said hexagonal shoulders when the outer ends of said studs contact closely within said thimble.

13. An adjustable combined ultrasonic tool holder and cutting or drilling tool according to claim 12 in which a continuous channel is provided centrally of said combined tool elements, said channel extending from an inlet near the larger end of said tapered tool holder to an outlet at the outer tip of said tool member.

14. A high frequency, vibratory impact cutting tool for drilling holes in substantially unyielding work materials, comprising, in combination, a hollow, blunt and enlarged ended cutting tool attached at its smaller end to the smaller end of an elongated, tapered vibration transmission element which is coupled at its larger end to a source of high frequency and low amplitude sound waves, means to move and to vibrate said tapered transmission element and said tool axially and to maintain said larger tool end in proximity to the face of the material to be cut, and means to inject into and to force from the interior of said hollow tool a liquid suspension of a comminuted abrasive and to impel it under and from said larger tool end, thus to scavenge abraded detritus from the locus between said abraded material and the cutting tool end.

15. The method of drilling holes in substantially unyielding work materials which comprises positioning and maintaining the end of a hollow, blunt and enlarged ended tool in proximity and axially normal to the confronting surface of said work material, interposing between the tool end and said surface, a liquid suspension of a comminuted abrasive, developing at the locus of abrasion, axial vibrations of high frequency and low amplitude, and impelling into and forcing through the interior of said tool and through said locus and past said enlarged tool end a continuous stream of said liquid suspension, thus to scavenge the abrasion detritus from said locus and said tool.

References Cited in the file of this patent

UNITED STATES PATENTS

| | | |
|---|---|---|
| 809,880 | Woolldridge | Jan. 9, 1906 |
| 2,093,810 | Karmazin | Sept. 21, 1937 |
| 2,460,919 | Bodine | Feb. 8, 1949 |
| 2,580,716 | Balamuth | Jan. 1, 1952 |

FOREIGN PATENTS

| | | |
|---|---|---|
| 1,180 | Great Britain | Jan. 18, 1901 |
| 231,280 | Great Britain | Apr. 2, 1925 |